(12) United States Patent
Schenk et al.

(10) Patent No.: US 8,126,042 B2
(45) Date of Patent: Feb. 28, 2012

(54) FEXT ESTIMATION AND SIGNALING IN VECTOR TRANSMISSION

(75) Inventors: Heinrich Schenk, Munich (DE); Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 789 days.

(21) Appl. No.: 12/186,549

(22) Filed: Aug. 6, 2008

(65) Prior Publication Data

US 2010/0034249 A1 Feb. 11, 2010

(51) Int. Cl.
*H04B 3/46* (2006.01)

(52) U.S. Cl. ........ 375/227; 375/252; 375/220; 375/222; 375/296; 375/346; 375/356

(58) Field of Classification Search .................. 375/252, 375/220, 222, 296, 346, 356, 227
See application file for complete search history.

(56) References Cited

U.S. PATENT DOCUMENTS

2001/0004383 A1\* 6/2001 Nordstrom et al. ........... 375/222
(Continued)

OTHER PUBLICATIONS

International Telecommunication Union Standardization Sector of ITU, G.993.2 Feb. 2006, Series G: Transmission Systems and Media, Digital Systems and Networks—Very high speed digital subscriber line transceivers (VDSL2), p. 7—top 3.60 Syncflag, p. 63—top 10.2—DMT superframe, pp. 84-85—top 10.5.3 On-line reconfiguration.

(Continued)

*Primary Examiner* — Kabir A Timory
(74) *Attorney, Agent, or Firm* — Eschweiler & Associates, LLC

(57) ABSTRACT

Embodiments related to FEXT estimation and signaling in vectored systems are described and depicted herein.

5 Claims, 11 Drawing Sheets

100

U.S. PATENT DOCUMENTS

2006/0146945 A1* 7/2006 Chow et al. .................. 375/260
2008/0291989 A1* 11/2008 Ashikhmin et al. .......... 375/224
2009/0175156 A1* 7/2009 Xu ............................... 370/201

OTHER PUBLICATIONS

International Telecommunication Union Standardization Sector of ITU, COM 15—C 177-E, Oct. 2006, Study Group 15—Contribution 177, Source: Upzide Labs, Title: G. vdsl2: Pilot sequence assisted vector channel estimation, pp. 1-6.

International Telecommunication Union Standardization Sector of ITU, Temporary Document SD-036, Jan. 2007, San Diego, California Study Group 15, Source1: Upzide Labs AB, ASSIA Inc., Title: G. vdsl2: Using orthogonal pilot sequences for assisting FEXT channel estimation in vector transmission.

* cited by examiner

Matrix without signaling $$XX^{*T} = |u_0|^2 \cdot \begin{bmatrix} 16 & 0 & 0 & 0 & 0 \\ 0 & 16 & 0 & 0 & 0 \\ 0 & 0 & 16 & 0 & 0 \\ 0 & 0 & 0 & 16 & 0 \\ 0 & 0 & 0 & 0 & 16 \end{bmatrix}$$

Matrix with signaling

502

M=10 lines

M=30 lines

M=50 lines

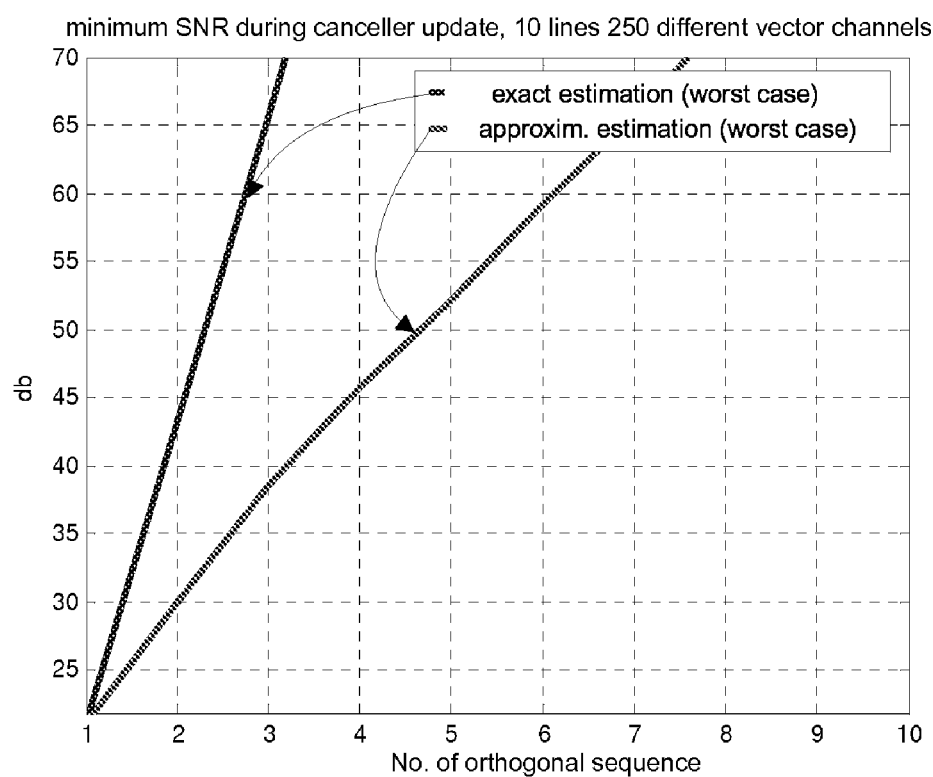
Fig. 7c  M=50 lines

FEXT ESTIMATION AND SIGNALING IN VECTOR TRANSMISSION

BACKGROUND

Vector transmission systems are widely used in communication systems and become more and more important for providing high throughput data transmission. Vector transmission systems can be regarded as a MIMO (multiple input multiple output) system where data are transmitted from multiple transmitters over multiple independent channels to multiple receivers.

For example, the DSL (digital subscriber line) transmission according to VDSL (very high bit rate DSL) uses a vector transmission system for transmitting data over a plurality of channels. For DSL the channels are the subscriber lines of the system. According to the VDSL standard, a frequency bandwidth of up to 30 MHz is divided into non-overlapping frequency bands for upstream and downstream communication. Cross-coupling at the near end, which is referred to NEXT (near end cross coupling) data signals is eliminated or reduced in such systems because of the separation of the frequency bands for upstream and downstream. The FEXT crosscoupling (far end cross coupling) which is the crosscoupling of signals at the far end resulting from a coupling of data signals transferred in a same direction on different lines may however reduce a data throughput due to the increased line coupling at higher band-width and lower length of the lines.

BRIEF DESCRIPTION OF THE SEVERAL VIEWS OF THE DRAWINGS

FIGS. 7a-7c show results of simulations according to an embodiment;

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims.

In the various figures, identical or similar entities, modules, devices etc. may have assigned the same reference number.

Figure 1A:
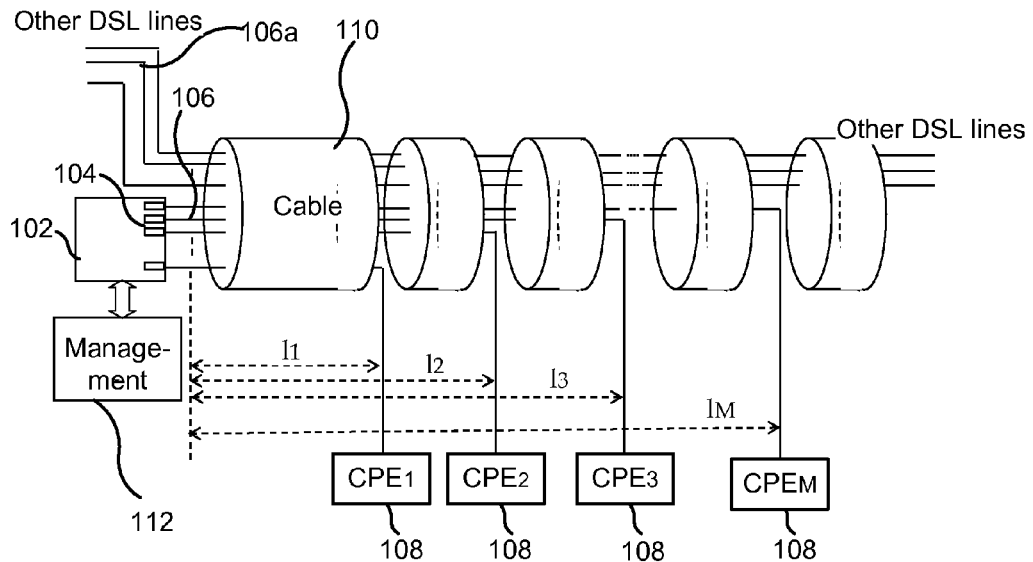
FIG. 1a shows a block diagram according to an embodiment of the present invention.

Referring now to FIG. 1a, an exemplary embodiment of a vector transmission system 100 is shown. In the following detailed description, exemplary embodiments are described with respect to a VDSL vector transmission system. It is to be noted however that the VDSL vector transmission system is only an exemplary embodiment of a vector transmission system and that vector transmission system 100 can be of any other type. Furthermore, it is to be understood that the lines of the VDSL vector transmission system are only one representation of channels of a vector transmission system and that the described VDSL lines may be replaced in other embodiments by other communication channels.

The VDSL vector transmission system comprises a DSLAM (Digital Subscriber Line Access Multiplexer) 102 having a plurality of first transceiver units 104 which are coupled to a plurality of lines 106. Each of the lines of the plurality of lines may for example be implemented as twisted pair wire. DSLAM 102 may be implemented in an Optical Network Unit (ONU) such as a Central Office (CO), a cabinet, an exchange or other types of network termination devices at the operator's end.

Each of the plurality of lines 106 connects the first transceiver units 104 at the operator's end with a respective second transceiver unit 108 at a subscriber end. The first transceiver units 104 are implemented to form with the second transceiver units 108 and lines 106 a vector transmission system. The second transceiver units 108 may for example be integrated in a costumer premise equipment (CPE) such as a home gateway, a router etc. The second transceiver units 108 may be located at different distances with respect to the transceiver units 104 such that the number of lines provided in a cable bundle or cable 110 is decreasing with increasing distance from the first transceiver units 108 as shown in FIG. 1a. It is however to be noted that the second transceiver units 108 may in other embodiments have a same or nearly a same distance from the first transceiver units.

At the operator's side, a management entity 112 may be provided to provide management functions such as spectrum management. As will be described later, the management entity 112 may perform also coordination functionality for transmitting FEXT probing signals.

Further lines which are not part of the vector transmission system, for example ADSL lines, SDSL lines or ISDN lines, which are designated in FIG. 1a with reference number 106a may be provided in the cable 110. As shown in FIG. 1a, the further lines 106a may terminate at other operator or subscriber termination locations. For example, the VDSL line may be terminated at a cabinet while the ADSL lines may be terminated at a Central Office. According to other embodiments of the present invention, all of the lines provided in the cable 110 may be connected to the first transceiver units. In such embodiments, all of the lines of the cable may be transmission lines of the vector transmission system while in the embodiment shown in FIG. 1a, only the lines connected to the first transceiver units 104 may be transmission lines of the vector transmission system.

Distortion of the data transmission on the vector transmission system occurs mainly by two types: distortions which are generated by the vector transmission itself also known as FEXT or self-FEXT and distortions from outside of the vector transmission system also known as alien noise.

While the alien noise typically can not be compensated, the FEXT distortions of the vector transmission system can be compensated by having knowledge of the signals, i.e. of the data transmitted over the lines of the vector transmission system.

In upstream direction all of the data send over the lines 106 terminate at one of the first transceiver units 104 of DSLAM 102. Therefore, at the receiver side, i.e. at the DSLAM, access to all data transmitted over the lines 106 can be provided.

In downstream direction, the data send over the lines 106 are received at the respective second transceiver units 108 which are typically placed at different locations. Typically, no channel between the receiving devices at the different subscriber locations is available. In this case, compensation at the subscriber's end can not be provided as the transceiver unit 108 at one subscriber has no information of the data send to the transceiver unit 108 at another subscriber.

Compensation of the FEXT can be achieved in this case by using a technique known as precompensation. In precompensation, which is also known as preceding or precancellation, the effect of crosstalk experienced by a signal during transmission is computed or estimated prior to transmitting the signal and the signal is modified based on this information for example by subtracting the calculated crosstalk from the transmission signal or adding the negation of the calculated crosstalk. Then, during the transmission, the transmission signal is exposed to the crosstalk, i.e. the crosstalk adds to the transmission signal resulting in the receiving of the original or nearly original, i.e. unmodified or nearly unmodified signal as provided at the transmitting side except of some other noise added during the transmission.

It is to be noted that the term FEXT compensation as used herein may include both the FEXT compensation at the receiver side as described above as well as to the FEXT precompensation at the transmitter side as described above.

In VDSL, data are transmitted using a multicarrier transmission known as DMT (discrete multitone transmission). Each of the frequency bands provided for data transmission is divided into a plurality of non-overlapping subcarriers (tones). For each subcarrier, data bits to be transmitted are represented by a complex number selected of a plurality of predefined complex numbers in a constellation space. The complex number is sometimes referred to as a constellation vector, a constellation point or a subcarrier symbol. For example, if a 4-QAM (Quadrature Amplitude Modulation) is used for subcarrier k, the complex number is selected from the predefined set of $\{1+j, 1-j, -1+j, -1-j\}$ where j is the imaginary unit. The complex number of each subcarrier is then transferred to a inverse Fourier transformation unit where a time domain representation is generated by an inverse Fourier transformation also known as DMT symbol.

Figure 1B:
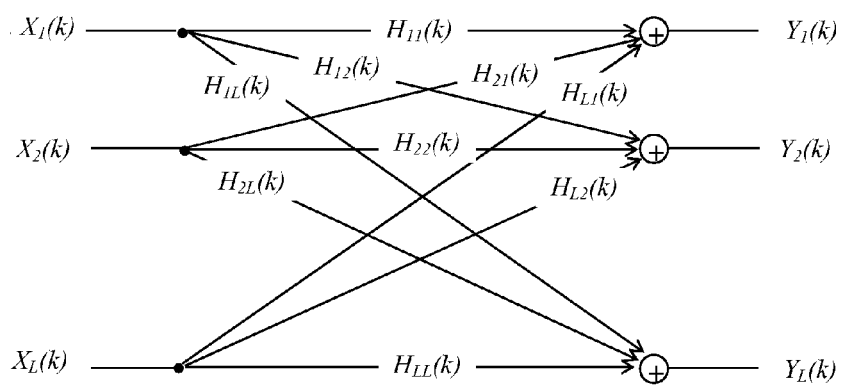
FIG. 1b shows an exemplary cross-coupling in a vector transmission system according to an embodiment.

In the above Vector transmission system, FEXT compensation may be provided independently of the other subcarriers. A model showing the cross-couplings for one of the plurality of subcarriers in a vector transmission system is shown in FIG. 1b. While FIG. 1b shows the model for one subcarrier, it is to be noted that the model can be applied to each other subcarrier of a DMT system. It is to be noted here that the above model can also be applied to a system wherein on each channel a single carrier modulation is used.

For each subcarrier, the transmission can be described by a MIMO (Multiple In Multiple Out) system wherein the transmission system is represented by a transmission matrix H. Diagonal coefficients $H_{ii}$ of the matrix H which are also known as line coupling coefficients define the attenuation and distortion due to the line characteristics of line i. Off-diagonal coefficients $H_{i,j}$ represent the FEXT transmission functions and define the FEXT coupling from line i to line j. For calculating FEXT (pre)compensation the FEXT coefficients for the respective subcarriers have to be determined.

According to the above model, the transmission matrix H(k) for a subcarrier k with L transmission lines is mathematically represented by $$H(k) = \begin{bmatrix} H_{11}(k) & H_{12}(k) & H_{13}(k) & \ldots & H_{1L}(k) \\ H_{21}(k) & H_{22}(k) & H_{23}(k) & \ldots & H_{2L}(k) \\ H_{31}(k) & H_{32}(k) & H_{33}(k) & \ldots & H_{3L}(k) \\ \vdots & \vdots & \vdots & & \vdots \\ H_{L1}(k) & H_{L2}(k) & H_{L3}(k) & \ldots & H_{LL}(k) \end{bmatrix}$$

As outlined above, in the matrix H(k), the coefficients $H_{i,j}$ with $i \neq j$ correspond to the FEXT coefficients $FEXT_{i,j}$ while the diagonal coefficients $H_{i,i}$ correspond to the line coefficients of channel i determining the transfer function of the transmitted signal on channel i.

In order to provide FEXT compensation, the coefficients of matrix H(k) have to be determined or estimated. This is accomplished according to embodiments of the present invention by transmitting a sequence of cross-coupling probe signals from the plurality of transceiver units 104 to the plurality of transceiver units 108 or from the plurality of transceiver units 108 to the plurality of transceiver units 104 as will be described below in more detail. Cross coupling probe signals are to be understood as signals which enable to estimate cross-coupling coefficients. As will be described below in more detail, the probe signals received at a transceiver unit 108 is measured and compared to a reference to determine a receive error (slicer error). The slicer error from the plurality of transceiver units 108 is then used to estimate the FEXT coupling coefficients. In embodiments, the cross-coupling probe signals are provided by a sequence of synchronization symbols (sync symbols) which in addition serve for the function of providing synchronization information (pilot signals) for the transmission system. The sequence may also be referred to as a pilot sequence or pilot signal sequence. As will be described in more detail below, in embodiments the sync symbols (pilot symbols) are in addition thereto used for signaling an online reconfiguration.

As outlined above, the probing (testing) and estimating of the cross-coupling for a respective subcarrier is independent to the probing and estimating for other subcarriers. Therefore, the selection of sequences for one subcarrier is independent of the selection of sequences for any other subcarrier. For example, according to embodiments, the same sequences can be used for each subcarrier or different sequences can be used for the respective subcarriers. Furthermore, it is to be noted that the above cross-coupling probe signals for one subcarrier may be used for a single-carrier system wherein only one carrier is used.

According to embodiments, the transmission of the cross-coupling probe signals on the plurality of channels is synchronized such that test signals are transmitted simultaneously on the channels of the Vector transmission system, i.e. during the same time slots. According to one embodiment, the sequence of cross-coupling probe signals are a sequence of pilot signals representing synchronization symbols (sync symbols) which are provided in an assemble of data frames also known as a superframe. For example the pilot signal may represent a sync symbol provided every 257th transmitted symbol allowing to transfer 256 data symbols representing user data in between. sync symbols and data symbols may be both DMT symbols, i.e. a representation of all subcarriers used for DMT modulation.

According to embodiments, the sequence of sync symbols transmitted in time on each channel is generated based on a modulation of predefined sync frames or sync words $u_0$ with a respective orthogonal sequence. After the end of the sequence modulated by an orthogonal sequence, the sequence is repeated for each channel.

The sequence [x(t1) ... x(tn)] of sync symbols in time transmitted for a channel can be written as the product of the sync word $u_0$ and the orthogonal sequence [s(t1) ... s(tn)], i.e. $[x(t1) \ldots x(tn)] = u_0 [s(t1) \ldots s(tn)]$. It is to be noted that in an embodiment orthogonal sequences modulate the sign of sync symbols of different lines. The orthogonal sequences may be periodical and may have the same length, but they are different by contents and orthogonal to each other.

Two sequences s' and s" are considered orthogonal when the dot product s'(t1)·s"(t1)+s'(t2)·s"(t2)+s'(t3)·s"(t3)+s'(t4)·s"(t4) . . . +s'(tN)·s"(tN) of the two sequences (or vectors formed by the sequences s' and s") is zero while the dot product of the sequence s' with itself and the dot product of the sequence s" with itself are non-zero. According to one embodiment, the orthogonal sequences are columns or rows of a Hadamard Matrix. A Hadamard matrix is an orthogonal matrix which contains only +1 and −1 such that any column (or row) is orthogonal to each other column (or row). Columns (or rows) of Hadamard matrixes are sometimes referred in the art as Walsh-Hadamard sequences or Walsh sequences. It is to be noted that the meaning of orthogonal sequences includes also pseudo-orthogonal sequences which are sequences wherein the dot product does not yield exactly zero but a small remainder in the order of one element of the sequence. One example of pseudo-orthogonal sequences is two m-sequence which are shifted against each other. A m-sequence is a pseudonoise sequence known in the art with specific autocorrelation properties. M-Sequences can be generated by using a feedback shift register.

The above described sync symbol sequences modulated by orthogonal sequences may be regarded as a representation of orthogonal sequences weighted by the predetermined symbol. This means that the orthogonal sequences, for example rows or columns of a Hadamard matrix, are multiplied for each subcarrier by the respective complex constellation vector (constellation point) of the predetermined sync symbol. Using Walsh-Hadamard sequences as orthogonal sequences, the predetermined or regular sync symbol is multiplied at each sync transmission position either with +1 or −1 based on the value of the orthogonal sequence element corresponding to the number of the transmission position.

The predetermined complex number for the predetermined sync symbol may be selected for each subcarrier from the 4 constellation points of a 4-QAM modulation representing the bit sequences 00, 01, 10 and 11. The constellation points for each subcarrier of the predetermined sync symbol can be different for subcarriers.

It is to be noted that the Sync symbol sequences transmitted on all channels of the vector transmission system are made orthogonal by the modulation with the orthogonal sequences and are therefore statistically independent. This allows using the sync symbol sequences as pilot signals as well as probing signals for fast estimation or acquisition of the FEXT coupling coefficients between the channels for example when a new line joins the vectored group or a fast updating of the coefficients of the FEXT cancellation matrix in an already existing vectored group.

Figure 2:
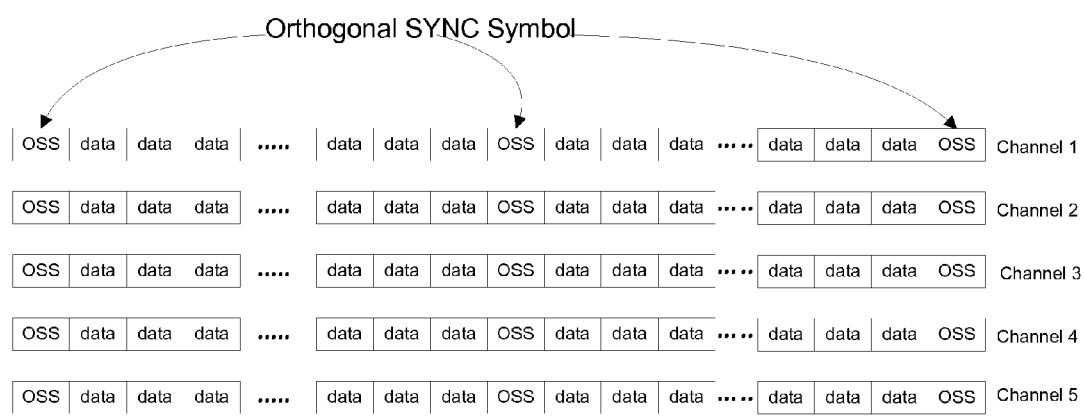
FIG. 2 shows a diagram of a synchronized transmit sequence for multiple channels of a vector transmission system according to an embodiment.
Figure 3A:
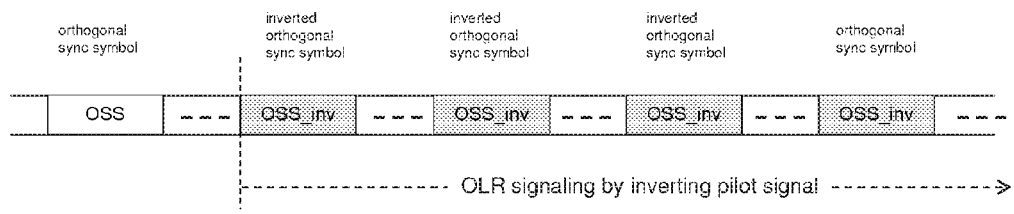
FIGS. 3a and 3b show two embodiments of signaling in a vector transmission system.
Figure 3B:
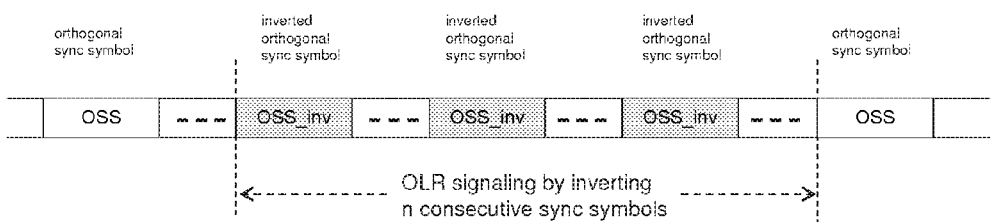

FIG. 2 shows an embodiment of the transmission of orthogonal modulated sync symbol sequences in vectored DSL channels. As can be seen, the sync symbols for each orthogonal modulated sync symbol sequence is transmitted on each channel (line) at the same time, i.e. at the same time slot. Between two consecutive sync symbols, data symbols are transmitted. In one embodiment of a VDSL system, the number of data symbols between consecutive sync symbols may be 256. The data symbols and the sync symbols form then a structure known as a superframe.

In order to estimate or determine the transmission matrix H, a slicer error is determined at the receiver side based on the received signal. The corresponding receiver unit is therefore operable to receive a sequence of signals and to determine a slicer error by comparing the sequence of received signals with a reference. The reference is an expected sequence of sync symbols which is corresponding with the transmitted sync symbol sequence.

In more detail, each transceiver unit measures each of the cross-coupling probe signals received and demodulates the signal by equalizing the signal and Fourier transforming the equalized signal. Equalizing the signal provides compensation for the signal attenuation on the respective channel represented by the diagonal coefficients of matrix H. Finally, a received complex number (in the constellation space) is obtained. Due to the cross-coupling effects and the alien noise experienced during the transmission, the received complex number and the original send complex number in the constellation space deviate from each other.

The coefficients of Matrix H(k) are then determined from the measured receive signal by estimating the receive error (sometimes referred to as error sample or slicer error) of the receive signal Y which is the deviation of the received signal from an expected constellation point.

If the cross-coupling test signals transmitted at a time t1 on all of a plurality of L channels are represented by a sender vector $$\vec{x}(t1) = \begin{bmatrix} x_1(t1) \\ x_2(t2) \\ \ldots \\ x_L(t1) \end{bmatrix}^T$$

where T indicates the transposed vector then the sequence of the cross-coupling probe signals transmitted at time slots t1, t2, . . . tN on all of the plurality of L channels can be obtained by a matrix $$X = \begin{bmatrix} x_1(t1) & x_1(t2) & \ldots & x_1(tN) \\ x_2(t1) & x_2(t2) & \ldots & x_2(tN) \\ \ldots & \ldots & \ldots & \ldots \\ x_L(t1) & x_L(t2) & \ldots & x_L(tN) \end{bmatrix}^T$$

where T indicates a transposed matrix. Similar, the sequence received at the receiver on all of the L channels at the time slots t1, t2, . . . tN can be written as a matrix $$Y = \begin{bmatrix} y_1(t1) & y_1(t2) & \ldots & y_1(tN) \\ y_2(t1) & y_2(t2) & \ldots & y_2(tN) \\ \ldots & \ldots & \ldots & \ldots \\ y_L(t1) & y_L(t2) & \ldots & y_L(tN) \end{bmatrix}^T.$$

The receive matrix Y can be obtained by multiplying the sender Matrix X with the transmission matrix H and adding a matrix $\Delta$ which takes into account the alien noise added during the transmission: $Y = XH + \Delta$.

The matrix representing the equalized receive error can then be expressed by $Z = Y(H_d)^{-1} - X = XH(H_d)^{-1} - X + \Delta(H_d)^{-1} = XF + \Delta(H_d)^{-1}$ where $H_d^{-1}$ represents a diagonal matrix having as coefficients the diagonal coefficients $H_{ii}$ of matrix H which is sometimes referred to as frequency equalizer (Feq) and F represents the equalized cross-coupling matrix without the transmit coefficients $H_{ii}$, i.e. all diagonals are zero.

Assuming a uniform distribution of the alien noise and using a least square estimate, the estimate $\hat{F}$ of the cross-coupling matrix H can be expressed by $$\hat{F} = (X^{*T}X)^{-1}X^{*T}Z \qquad \text{[Equation 1]}$$

where $X^{*T}$ represent the transposed and complex conjugated matrix of matrix X and $(X^{*T}X)^{-1}$ is the inverse of the autocorrelation matrix $(X^{*T}X)$.

By using orthogonal sequences as described above, the estimated cross-coupling matrix can be calculated in a simple way since $(X^{*T}X)^{-1}$ is for a modulation with orthogonal sequences proportional to the unity matrix. For example, assuming that $X=u_0S$, where S is an orthogonal Walsh-Hadamard matrix and $u_0$ is a predetermined sync symbol, $(X^{*T}X)^{-1}$ becomes equal to $|u_0|^2 (S^TS)^{-1}$.

It is to be noted that the estimate $\hat{F}$ of the cross-coupling matrix is calculated in embodiments by using both real and imaginary part of the receive error Z. However, the estimate $\hat{F}$ of the cross-coupling matrix may in some embodiments be calculated by using only the real part of the receive error matrix or by using only the imaginary part of the receiver error matrix.

In embodiments, the synchronization signals modulated with the orthogonal sequence are used in addition to FEXT probing for signaling an online-reconfiguration flag (OLR flag) from one transceiver to the other transceiver. In other words, every of the transmitted consecutive sync symbols can be used for FEXT probing and is in addition useable for signaling an the exact starting point of an online-reconfiguration by modifying a part of the sync symbol sequence, i.e modifying one or more of the sync symbols. It is however to be noted that instead of using the sync symbol sequence for online reconfiguration, other flags may be signaled by modifying the sync symbol sequences.

It is to be noted here that the modification of at least a part of the sequence of sync symbols for one channel for example by reversing (inverting) the sign of the sync symbols or by shifting the constellation points of the sync symbols destroys the structure of the synchronization signals for the overall system of vector channels. In other words, the modified sequence transmitted on this channel will no longer be orthogonal to the sequences of the other channels. This provides a conflict since the inversion of the matrix $(X^{*T}X)^{-1}$ is much more complicated.

Embodiments will be described below which address the above and provide a concept which allows it still to use the synchronization signals modulated by an orthogonal sequence in an efficient way for estimating FEXT coupling coefficients as well as for signaling online reconfiguration even if the orthogonality is destroyed. As will be described in more detail, in embodiments an approximation of the above matrix $(X^{*T}X)^{-1}$ is used. It is to be noted that by destroying the orthogonality of the sequence of sync signals, the autocorrelation matrix $(X^{*T}X)$ is no longer a diagonal matrix. This can be seen by looking at the following example.

In the following example, it is assumed that the synchronization signals are generated using Walsh-Hadamard sequences of length 16 which modulate the real and the imaginary part of a complex predetermined sync symbol. The predetermined sync symbol may for example be based on a 4 QAM-constellation.

Figure 4A:
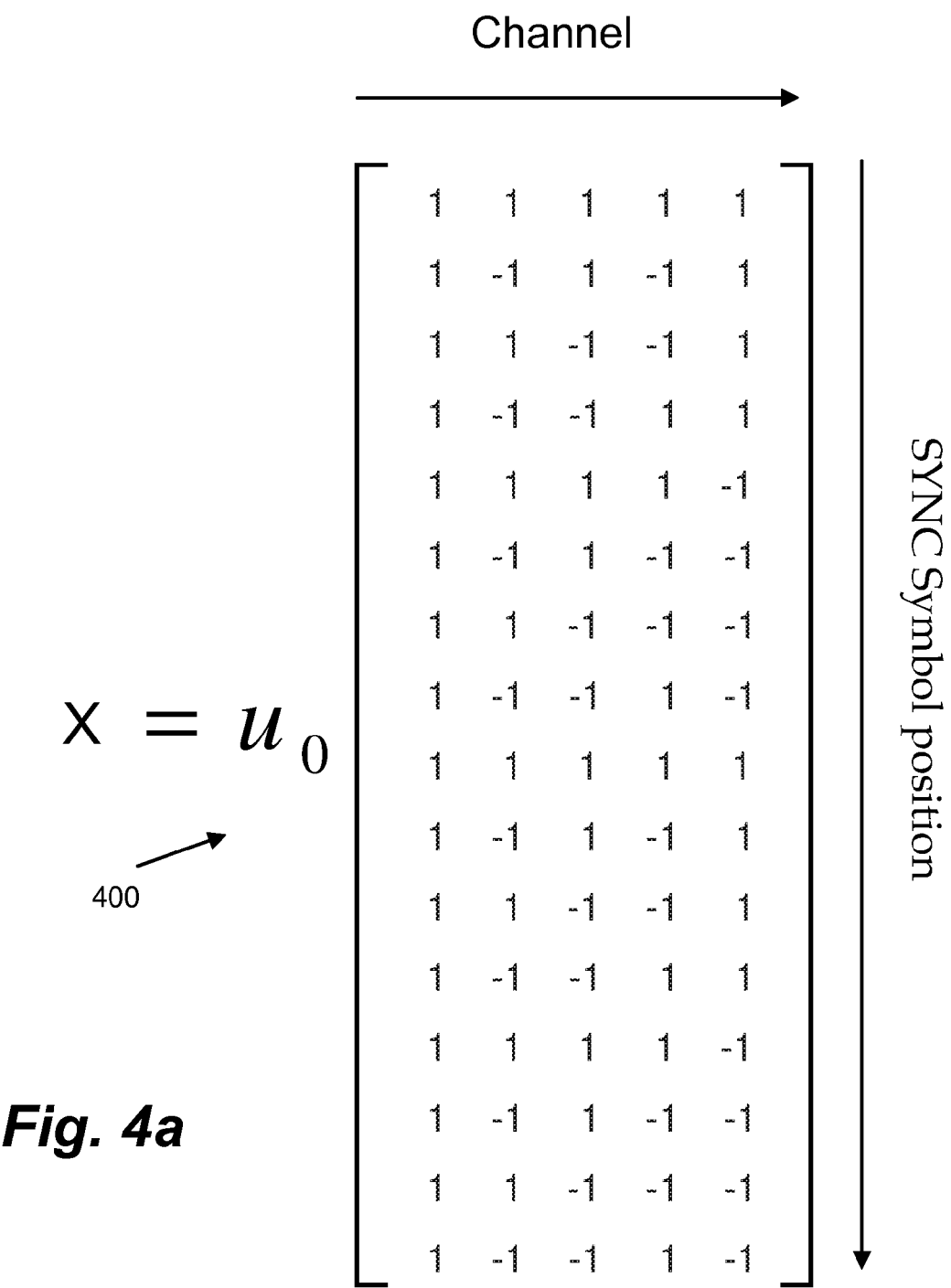
FIGS. 4a and 4b show embodiments of sync symbol sequences.

The orthogonal transmit matrix X for a vectored system of 5 lines can be written as shown in FIG. 4a. A predetermined non-modulated sync symbol $u_0$ is multiplied by a Walsh-Hadamard matrix S shown in FIG. 4a with reference number 400. It is assumed in this example that the FLAG is signaled in channel 2 (line 2) at the sync symbol timeslot 7 (position 7). It is further assumed that the modification is an inverting of the sync symbol.

Figure 4B:
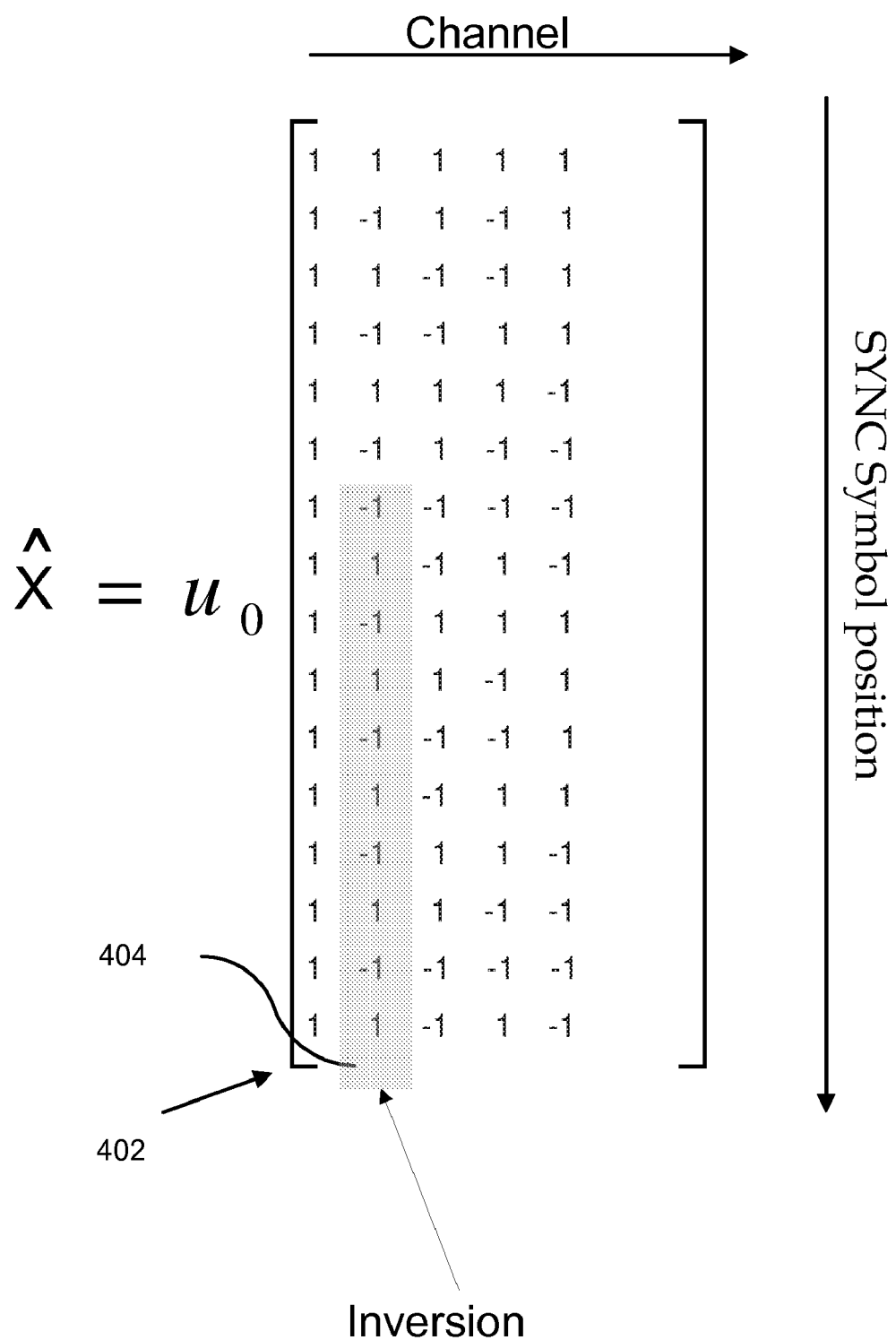

Then a modified transmit matrix $\hat{X}$ may be obtained as shown in FIG. 4b wherein the modified transmit matrix is equal to the multiplication of the predetermined sync symbol $u_0$ with a modified Walsh-Hadamard matrix $\hat{S}$ denoted in FIG. 4b with 402. It can be seen in FIG. 4b that in the sequence of channel 2 a part of the sync symbol sequence including the seventh transmitted sync symbol and all subsequent sync symbols has inverted sync symbols compared to the corresponding sequence of the Walsh-Hadamard matrix 400 shown in FIG. 4a since a part with reference 404 of the modified Walsh-Hadamard matrix 402 is reversed. It can further be verified that the transmitted sequence of channel 2 is no longer orthogonal to the transmitted sequences of the other channels since the modified Walsh-Hadamard matrix 402 is no longer an orthogonal matrix.

Figures 5A, 5B:
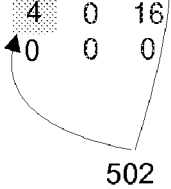
FIGS. 5a and 5b show embodiments of matrix products.

Calculating now the matrix $(X^{*T}X)$ which is required in equation 1 for determining the estimate of FEXT crosscoupling, a matrix as shown in FIG. 5a is obtained for the sync symbol sequence having no signaling of an online reconfiguration. It can be seen in FIG. 5a that without signaling the online re-configuration, the matrix $(X^{*T}X)$ is obtained in a form of a diagonal matrix which can easily be inverted.

The matrix $(X^{*T}X)$ for the online reconfiguration corresponding to FIG. 4b is shown in FIG. 5b. As can be seen, the matrix $(X^{*T}X)$ has nonzero numbers in secondary diagonals indicated by 502. Thus, the matrix $(X^{*T}X)$ is no longer orthogonal and the inversion of the matrix for estimating the FEXT coupling coefficients is much more complex and time consuming. It should be noted here that in case of the signaling of the Flag only the orthogonality of the current sequence will be disturbed. The subsequent sequences will be orthogonal again even if the sync symbols of the corresponding channel are kept inverted. A single online reconfiguration destroys therefore only one orthogonal sequence, but since the sequences are repeated after the end of each sequence, the following sequences for this channel will maintain orthogonality to all other sequences of the other channels assuming that no modification occurs in the other channels. In embodiments, upon the occurrence of a online reconfiguration flag, the modification of the sync symbols may be provided for a predetermined number of consecutive sync symbols. In this embodiment, after the consecutive number of sync symbols is transmitted, the sync symbols are then again provided nonmodified. In other embodiments, the modification of the sync symbols may be maintained until the next online reconfiguration flag is signaled in this channel.

Addressing the above problems of estimating FEXT coupling coefficients in the case of signaling online reconfiguration, embodiments described in the following provide an effective and non-complex way of estimating the FEXT coupling coefficients by using an approximation of the matrix $(X^{*T}X)$ in Equation 1. The other term $X^{*T}Z$ used in Equation 1 for estimating the FEXT coupling coefficients may however be used in the calculation in the exact non-orthogonal matrix $\hat{X}^{*T}$. $\hat{X}$ can be written as $\hat{X}=u_0\hat{S}$ where $\hat{S}$ is a modified Walsh-Hadamard matrix having a modified orthogonal sequence which is no longer orthogonal to each other sequence of the Walsh-Hadamard matrix. The matrix $(\hat{X}^{*T}\hat{X})$ is then obtained by $|u_0|^2 \hat{S}^T\hat{S}$. In embodiments, the approximation for $(\hat{X}^{*T}\hat{X})$ is then obtained by using an approximating for the matrix $\hat{S}^T\hat{S}$. In an embodiment, the approximated matrix of $\hat{S}^T\hat{S}$ is approximated in order to be of the diagonal form. In one embodiment, the diagonal elements of the approximated matrix of $\hat{S}^T\hat{S}$ have the same value as the diagonal elements of the non-modified matrix $(S^TS)$. In one embodiment, the matrix $(\hat{X}^{*T}\hat{X})$ is estimated by using for each diagonal element the same value of the diagonal elements as for the matrix $(X^{*T}X)$ in the case without signaling. In this embodiment, the matrix $(X^{*T}X)$ is calculated and the diagonal elements are taken from this matrix to provide the approximated matrix.

It has been realized by the inventor that, although estimation is by nature not a precise determination, in operations of a vectored system the deviation of the estimation does not significantly disturb the estimation of FEXT canceler coefficients and the inaccuracy is rather small and tolerated in practical cases. Furthermore, it has been realized by the inventor that the deviation of the estimation depends on the amount of the FEXT couplings and the position of the online-reconfiguration signaling. If the online reconfiguration is signaled in the middle of the sequence, the FEXT coefficient estimation is most effected compared to having the online reconfiguration signaled at the beginning or the end of the sequence. In some embodiments, this may be taken into account when signaling the online reconfiguration by providing the signaling at the beginning or end.

In some embodiments, three phases of operation sensitive to FEXT estimation are provided. The first phase corresponds to a tracking phase, when operating line updates temperature changes and other small changes in FEXT coupling co-efficients. The next phase corresponds to a learning phase, when all the channels are turned on simultaneously, for example after a power-down. The third phase corresponds to a joining phase, when one or sometimes more than one line are turned on and intend to join the group of vectored lines.

In the learning phase no online-reconfiguration signaling is expected, since all lines are in the stage of the startup, when no online-reconfiguration is used.

In the tracking phase most of the FEXT is cancelled so that only changes in FEXT characteristics have to be estimated. In this case the simplified estimation will not affect the tracking behavior.

In the joining phase, at the beginning the resulting FEXT (uncompensated FEXT in the joining line) is much higher than in the tracking phase. In case of online-reconfiguration signaling during this phase (in one or more of vectored lines) the FEXT cancellation from the joining line into vectored lines which are not a subject for online-reconfiguration can be affected if the simplified inverted autocorrelation matrix is being used. However the non-exact estimation will not cause a non stable state, it only may slightly slow down FEXT estimation and thus slightly increase the duration of training for the joining line as is confirmed with simulation results. The slight increase of training time can however be easily tolerated.

The effect of temporary broken orthogonality in sync symbol sequences due to online-reconfiguration on the time of estimation of FEXT coupling will be described in the following by referring to simulations shown in FIGS. 6a-c and 7a-c.

In the simulations of FIGS. 6a-c and 7a-c, vectored data transmission systems consisting of 10, 30, and 50 wired lines have been analyzed. The FEXT couplings between the lines were simulated using measured FEXT couplings from 250 randomly selected cable samples. As is known in the art, different cable samples give rise to different FEXT couplings in view of the different arrangement and distances of the wired lines in the cable samples. It was assumed, that each of the vectored lines performs one online-reconfiguration signaling at the randomly picked instant of time during each period of a pilot sequence. This is a worst case scenario which will actually not occur in a normal vectored system in use.

For this scenario the FEXT couplings are estimated using the approximation of the matrix $(\hat{X}^{*T}\hat{X})$ with a diagonal form having the same diagonal elements as the non-approximated matrix $(X^{*T}X)$ in the non-signaling case. The coefficients of the precanceller matrix are then computed using the approximated matrix by first order estimation. The analysis has been done for the above mentioned 250 FEXT coupling samples without consideration of alien noise. FIGS. 6a-c and 7a-c show the results of an artificially built test. Simulations have been performed for 250 different vectored systems representing 250 different cable bundle arrangments for vectored systems with 10, 30 and 50 lines. The length of the orthogonal sequence is taken to be 128 sync symbols (128 VDSL2 super frames).

A simultaneously performing of a joining event into a vectored group has been assumed in the simulations, while all of them are also performing online-reconfiguration at random moments. From all the 250 simulations which are performed for each vector size of 10, 30 and 50 lines, the vectored system with the worst behaviour is ploted in the FIGS. 6a-c and 7a-c.

Figure 6A:
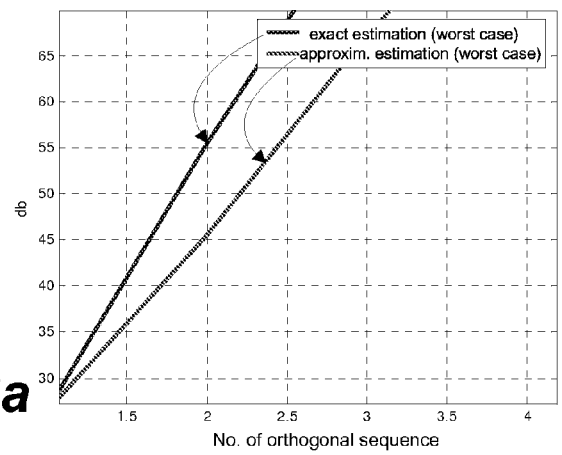
FIGS. 6a-6c show results of simulations according to an embodiment.
Figure 6B:
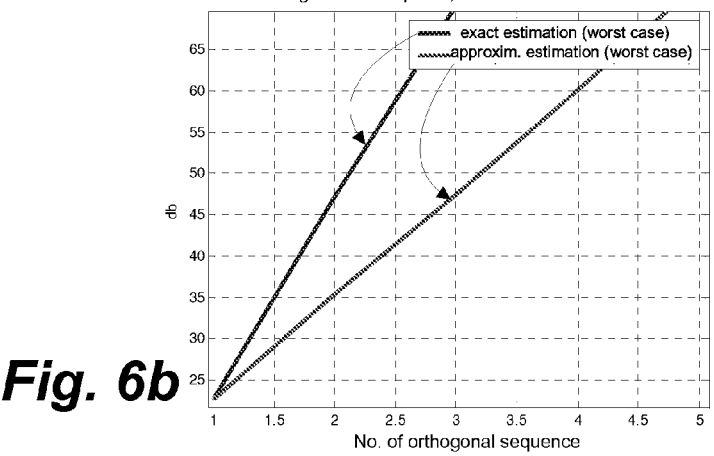
Figure 6C:
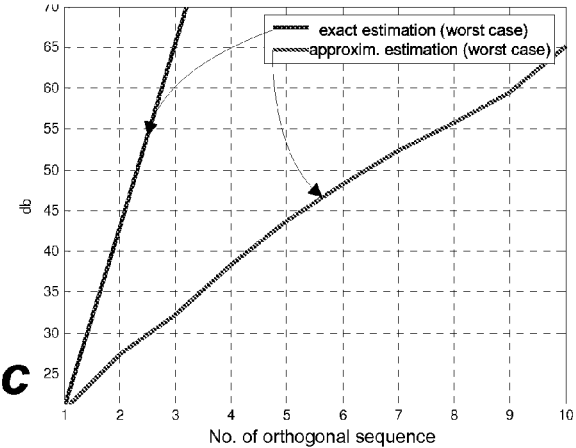
Figure 7A:
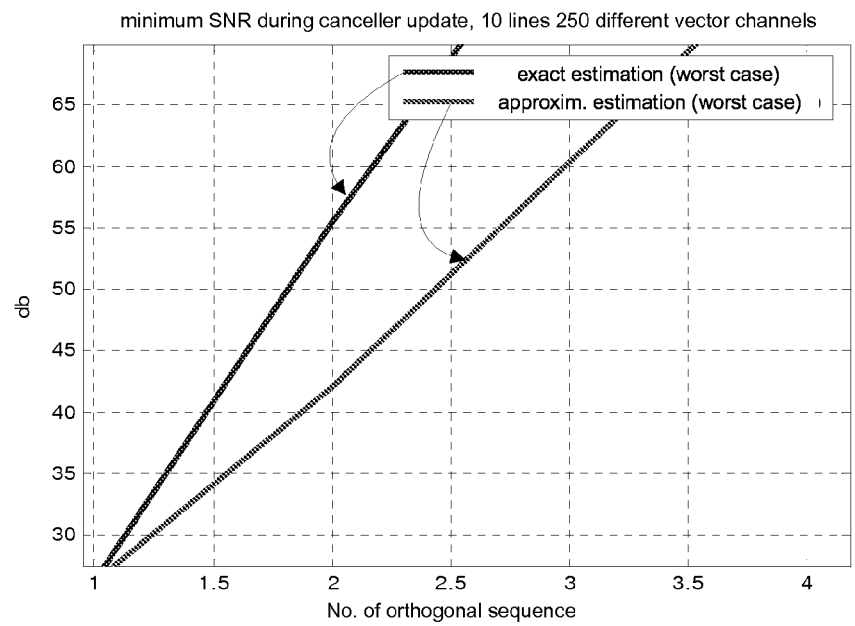
Figure 7B:
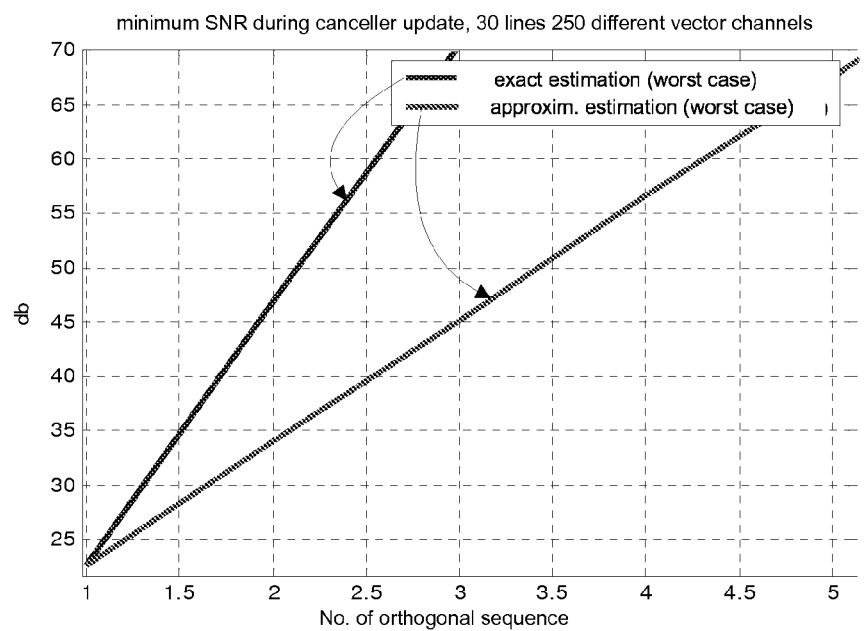

FIGS. 6a-c and 7a-c show for this worst case amongst all the 250 simulations the improvement of the SNR behavior due to improved estimations of the FEXT coupling using the above described approximiation of the matrix for the respective vectored transmission system of 10, 30 and 50 lines. For comparison, calculations are in addition shown in FIGS. 6a-c and 7a-c which use the exact matrix $(\hat{X}^{*T}\hat{X})$ for estimating the FEXT coupling. FIGS. 6a-c show the SNR behavior in case of inverting all the corresponding pilot symbols after the online-reconfiguration flag i.e. maintaing in reversion of the sync symbols, and FIGS. 7a-c in case of inverting 4 consecutive sync symbols to signal online-reconfiguration (3 symbols after the online-reconfiguration Flag).

By comparing the results of FIGS. 6a-c and FIG. 7a-c it can be seen that in case of a large number of vectored systems (e.g. 50 lines) the worst case behavior is improved for the embodiment of using 4 consecutive reverted sync symbols for an ORL signaling. However, it is to be mentioned that each of the vectored transmission systems provides steady converging towards the optimal FEXT compensation.

Figure 8:
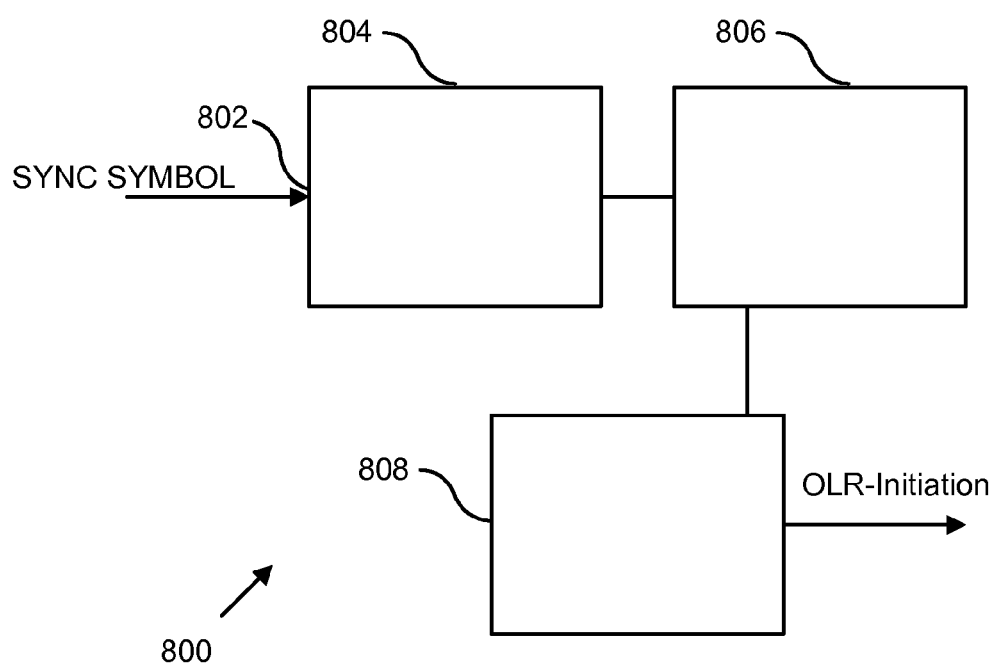
FIG. 8 an embodiment of a receiver device.

An embodiment of a receiver device 800 used in an implementation of the above described vectored system will be described with respect to FIG. 8. The receiver device 800 has an input 802 to receive from a transmitter of the vectored system signals representing a plurality of sync symbols via a channel of a plurality of channels of a vectored system. As described above, the plurality of sync symbols is based on a multiplication with an orthogonal sequence. The receiver device 800 has an entity 804 provided to determine an slicer error information of the received plurality of sync symbols by comparing the received signals to a reference. An entity 806 is coupled to the entity 804 to detect a modification of at least a part of the sync symbols compared to an expected sync symbol sequence. The entity 806 detects the change of the sync symbols based on the outcome of slicer errors. For example, if the modification is a reverting of the sync symbol, the entity 806 may compare the received synchronization signals to a first reference and a second reference which is the reverted first reference. In one embodiment, if the received signal is close to the first reference the sync symbols may be determined to be non-modified while when the received sync symbols are close to the second reference, the sync symbols may be determined to be modified. A threshold can be defined in order to determine whether the received sync symbol is a modified sync symbol or not. The entity 804 is configured to modify the reference by switching from the first reference to the second reference, when the modification is detected for at least one sync symbol. The entity 804 is for example configured to change from a predetermined first reference sequence to a modified second reference sequence, when the modification of at least a part (i.e. one or more) of the sync symbols is detected, wherein both, the first and the second reference sequences are based on an orthogonal sequence.

Modification may in one embodiment be the reversing of the sync symbols. In this case, the entity 804 may be configured to reverse the constellation points of the first reference sequence when the modification of at least a part of the sync symbols is detected. Modification may in one embodiment be a phase shifting of the constellation points of the sync symbols. The entity may then be configured to shift the constellation points of the first reference sequence when the modification of at least a part of the sync symbols is detected.

An entity 808 is further provided in the receiver device 800 to initiate an online reconfiguration for the receiver device based on the detection of a modification of at least part of the sync symbols. It is to be understood that the entities 804, 806 and 808 may be either provided in hardware, software/firmware or combinations thereof. The entities 804, 806 and 808 may further be implemented by a single circuit on a single chip or by a single software running on a single computer.

Figure 9:
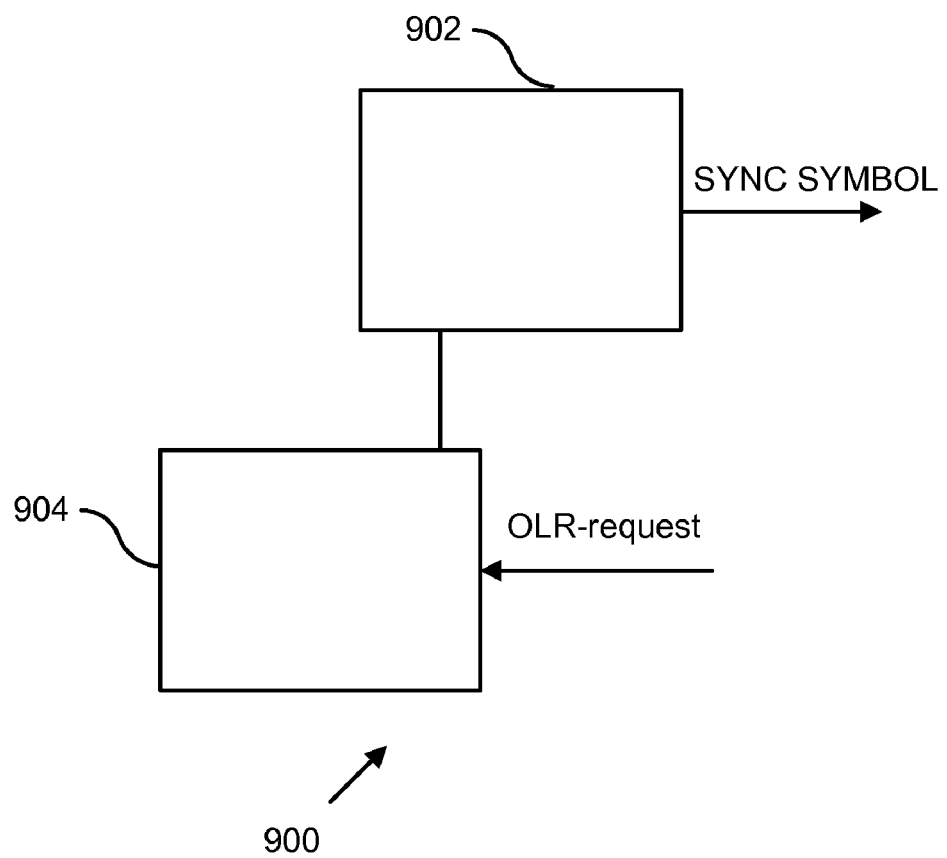
FIG. 9 an embodiment of a transmitter device.

An embodiment of a transmitter device which may be used in the vectored communication system will now be described with respect to FIG. 9. The transmitter device 900 comprises an entity 902 configured to generate a plurality of sync symbols to be transmitted to a receiver via a channel of a plurality of channels of a vectored system. As described above, the plurality of sync symbols is based on a multiplication with an orthogonal sequence. An entity 904 is provided to modify at least a part of the plurality of sync symbols in order to signal an online-reconfiguration to the receiver. The entity 904 is therefore coupled to the entity 902 to allow the modification of the transmitted sync symbols.

The entity 904 may comprise an input to receive a request to signal an online reconfiguration to the receiver device and to provide the modification based on the received request. As described above, the orthogonal sequence used in the entity 902 may be a row or a column of a Walsh-Hadamard matrix. The modified part of the sync symbols may result in a sequence which is no longer orthogonal with respect to other rows or columns of the Walsh-Hadamard matrix used to generate the transmission vector of the vectored transmission system. As described above, modification may be a reverting of the sync symbols. Thus, the entity 904 may be configured to reverse constellation points for the modified part of sync symbols.

In another embodiment, the entity 904 may be configured to shift constellation points for the part of the sync symbols. A FEXT estimation entity may be provided in the vecotered system having an input to receive slicer errors from the plurality of receivers of the vectored system. A circuit may be provided in the FEXT estimation entity to generate the approximated matrix being an approximation of the matrix $(\hat{S}^T\hat{S})^{-1}$ where $\hat{S}$ is the modified Walsh-Hadamard matrix, and $\hat{S}^T$ is the transposed of the modified Walsh-Hadamard matrix. Furthermore, a circuit may be provided in the FEXT estimation entity to calculate FEXT cross-coupling coefficients based on a multiplication of the approximated matrix with a slicer error vector, the slicer error vector comprising the slicer errors.

The FEXT estimation entity may be configured to calculate the FEXT cross-coupling coefficients based on a multiplication of the approximated matrix with the slicer error vector and the non-approximated Matrix $\hat{S}^T$. As outlined above, the approximated matrix may be a diagonal matrix. The FEXT estimation entity is configured to provide the approximated matrix based on a multiplying of the non-modified transposed of the Walsh-Hadamard matrix $S^T$ with the non-modified Walsh-Hadamard matrix S as outlined above. It is to be understood that the entities 902, 904 and the FEXT estimation entity may be either provided in hardware, software/firmware or combinations thereof. The entities 902, 904 and the FEXT estimation entity may further be implemented by a single circuit on a single chip or by a single software running on a single computer.

A plurality of the transmitter devices 900 and a plurality of the receiver devices 800 may be implemented to form a vectored system as shown in FIG. 1a. The FEXT estimation entity described above may be implemented in the management entity 112 as described with respect to FIG. 1a.

While the above embodiments have been described with respect to a Walsh-Hadamard matrix, it is to be noted that in other embodiments the Walsh-Hadamard matrix may be replaced by another matrix for example a m-sequence matrix which contains m-sequences as columns or rows. Furthermore, while the above description uses the modification of the sync symbols for transmitting an online reconfiguration flag, it is to be understood that any other flag can be transmitted by using the modification of sync symbols as described above.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. Furthermore the terms "coupled" or "connected" may be interpreted in a broad sense not only covering direct but also indirect coupling.

The accompanying drawings that form a part hereof show by way of illustration, and not of limitation, specific embodiments in which the subject matter may be practiced.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A device comprising:
    an input to receive from a first transmitter via a channel of a vectored system signals representing a plurality of synchronization symbols, the plurality of synchronization symbols being based on a modulation with an orthogonal sequence;
    a first entity to detect a modification of at least a part of the synchronization symbols compared to an expected synchronization symbol sequence; and
    a second entity to determine a slicer error information of the received plurality of synchronization symbols by comparing the received signals to a reference, the second entity being configured to modify the reference, when the modification of at least a part of the synchronization symbols is detected;
    a third entity to determine that a flag has been transmitted based on the detection of a modification of at least part of the synchronization symbols.

2. The device according to claim 1, wherein the second entity is configured to change from a predetermined first reference sequence to a modified second reference sequence when the modification of at least a part of the synchronization symbols is detected, wherein the first and second reference sequences are based on an orthogonal sequence.

3. The device according to claim 1, wherein the second entity is configured to reverse the constellation points of the first reference sequence when the modification of at least a part of the synchronization symbols is detected.

4. The device according to claim 1, wherein the second entity is configured to shift the constellation points of the first reference sequence when the modification of at least a part of the synchronization symbols is detected.

5. A vectored communication system, the vectored communication system comprising:
    a first device, the first device comprising:
    a first entity configured to generate a plurality of synchronization symbols to be transmitted to a receiver via a channel of a plurality of channels of a vectored system, the plurality of synchronization symbols being based on a multiplication with an orthogonal sequence; and
    a second entity configured to modify at least a part of the plurality of synchronization symbols in order to signal a flag to the receiver; and
    a second device, the second device comprising:
    an input configured to receive from the first device signals representing the plurality of synchronization symbols,
    a third entity configured to detect a modification of at least a part of the synchronization symbols compared to an expected synchronization symbol sequence; and
    a fourth entity to determine a slicer error information of the received plurality of synchronization symbols by comparing the received signals to a reference, the fourth entity being configured to modify the reference, when the modification of at least a part of the synchronization symbols is detected; and
    a fifth entity to determine that a flag has been received based on the detection of a modification of at least part of the synchronization symbols.

* * * * *